United States Patent
Tanaka et al.

(10) Patent No.: US 8,362,190 B2
(45) Date of Patent: Jan. 29, 2013

(54) METHOD FOR PRODUCING HYPERBRANCHED POLYMER

(75) Inventors: Akihiro Tanaka, Funabashi (JP); Satoru Hatayama, Toyama (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 259 days.

(21) Appl. No.: 12/677,703

(22) PCT Filed: Sep. 11, 2008

(86) PCT No.: PCT/JP2008/066436
§ 371 (c)(1),
(2), (4) Date: Apr. 20, 2010

(87) PCT Pub. No.: WO2009/035042
PCT Pub. Date: Mar. 19, 2009

(65) Prior Publication Data
US 2010/0311933 A1 Dec. 9, 2010

(30) Foreign Application Priority Data

Sep. 12, 2007 (JP) ................................. 2007-237306
Dec. 19, 2007 (JP) ................................. 2007-327417

(51) Int. Cl.
*C08F 8/04* (2006.01)
*C08F 12/04* (2006.01)
*C08F 20/10* (2006.01)
(52) U.S. Cl. .................................... 528/286; 528/288
(58) Field of Classification Search .................. 526/286, 526/288
See application file for complete search history.

(56) References Cited

U.S. PATENT DOCUMENTS

2004/0014910 A1 * 1/2004 Wang ............................. 526/85
2009/0163657 A1 * 6/2009 Tanaka et al. .................... 525/55

FOREIGN PATENT DOCUMENTS

| EP | 1854814 | * 11/2007 |
| JP | A-5-188658 | 7/1993 |
| JP | A-2002-500251 | 1/2002 |
| JP | A-2002-508409 | 3/2002 |
| JP | A-2004-509181 | 3/2004 |
| WO | WO 2006/093050 A1 | 9/2006 |
| WO | 2007/049608 | * 5/2007 |
| WO | WO 2007/049608 A1 | 5/2007 |
| WO | WO 2008/029688 A1 | 3/2008 |

OTHER PUBLICATIONS

Ishizu et al., "Synthesis of hyperbranched polymers by self-addition free radical vinyl polymerization of photo functional styrene," *Macromolecular Rapid Communications*, 2000, pp. 665-668, vol. 21—No. 10.

Ishizu et al., "Novel synthesis of branched polystyrenes by quasi-living radical copolymerization using photofunctional inimer," *Polymer International*, 2001, pp. 906-910, vol. 50.

Ishizu et al., "Kinetics of Hyperbranched Polystyrenes by Free Radical Polymerization of Photofunctional Inimer," *Macromolecules*, Mar. 27, 2002, pp. 3781-3784, vol. 35—No. 9.

Ishizu et al., "Synthesis and characterization of hyperbranched poly(ethyl methacrylate) by quasi-living radical polymerization of photofunctional inimer," *Polymer International*, 2002, pp. 424-428, vol. 51.

Ishizu et al., "Kinetics on Formation of Hyperbranched Poly(ethyl methacrylate) via a Controlled Radical Mechanism of Photofunctional Inimer," *Macromolecules*, 2003, pp. 3505-3510, vol. 36—No. 10.

Ishizu et al., "Novel Synthesis and solution properties of hyperbranched poly(ethyl methacrylate)s by quasi-living radical copolymerization using photofunctional inimer," *Polymer International*, 2004, pp. 259-265, vol. 53.

Ishizu et al., "Synthesis of alternating hyperbranched copolymers using photofunctional inimer via living radical mechanism," *Polymer Communication*, 2001, pp. 7911-7914, vol. 42.

Otsu et al., Synthesis, Reactivity, and Role of 4-Vinylbenzyl N,N-Diethyldithiocarbamate as a Monomer-Iniferter in Radical Polymerization, *Macromolecules*, 1986, pp. 287-290, vol. 19—No. 2.

International Search Report mailed Dec. 9, 2008 issued in International Patent Application No. PCT/JP2008/066436 (with translation).

* cited by examiner

*Primary Examiner* — Ling Choi
*Assistant Examiner* — Chun-Cheng Wang
(74) *Attorney, Agent, or Firm* — Oliff & Berridge, PLC

(57) ABSTRACT

There is provided a method for producing a hyperbranched polymer. A method for producing a hyperbranched polymer comprising polymerizing a dithiocarbamate compound of Formula (1):

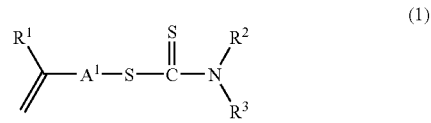

(1)

wherein $R^1$ is H or $CH_3$; $R^2$ and $R^3$ are individually a $C_{1-5}$ alkyl group, etc., $A^1$ is Formula (2) and/or Formula (3):

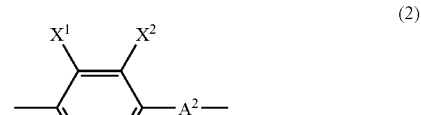

(2)

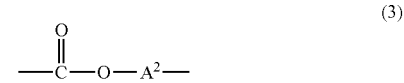

(3)

wherein $A^2$ is a linear, branched or cyclic $C_{1-30}$ alkylene group that optionally contains an ether bond or an ester bond and $X^1$, $X^2$, $X^3$ and $X^4$ are each independently H, a $C_{1-20}$ alkyl group, etc., by heating at 50 to 250° C.

7 Claims, 2 Drawing Sheets

5nm

5nm

METHOD FOR PRODUCING HYPERBRANCHED POLYMER

TECHNICAL FIELD

The present invention relates to a method for producing a hyperbranched polymer, and particularly, relates to a method for producing a hyperbranched polymer in which a dithiocarbamate compound containing a polymerizable unsaturated bond group such as a styryl group and/or an acryl group is polymerized by heating.

In addition, the present invention relates to a method for polymerizing a dithiocarbamate compound containing a polymerizable unsaturated bond group such as a styryl group and/or an acryl group by heating and a product obtained thereby.

BACKGROUND ART

Hyperbranched polymers are classified as dendritic polymers together with dendrimers. While related-art polymers generally have a string form, these dendritic polymers have a highly branched structure. Accordingly, expectations lie in practical application utilizing various characteristics in a respect of having a specific structure, a respect of having a nanometer size, a respect of being capable of forming surfaces retaining many functional groups, a respect of being capable of having a low viscosity compared with linear polymers, a respect of exhibiting a behavior like fine particles with little entanglement of molecules, and a respect of being capable of becoming amorphous to control their solubility in a solvent.

Hyperbranched polymers contain a mixture of linear and completely branched repeating units. On the contrary, idealized dendrimers do not have any linear repeating units, but only contain completely branched repeating units.

An advantage of the hyperbranched polymer over the dendrimer is in its simplicity for synthesis, which is advantageous particularly in industrial production. Generally, while the dendrimer is synthesized by repeating protection and deprotection, the hyperbranched polymer is synthesized by a one-step polymerization of a so-called $AB_X$ type monomer having in one molecule thereof, three or more substituents of two types.

As a method for producing the hyperbranched polymer, the method by photopolymerization of a compound having a dithiocarbamate group with a photopolymerization initiating ability and having a styryl group and/or an acryl group has been known.

For example, a method for synthesizing a hyperbranched polymer by a photopolymerization of a styrene compound having a dithiocarbamate group (see Non-Patent Documents 1, 2 and 3), a method for synthesizing a hyperbranched polymer having a dithiocarbamate group by a photopolymerization of an acryl compound having a dithiocarbamate group (see Non-Patent Documents 4, 5 and 6) and a method for synthesizing a hyperbranched polymer having a dithiocarbamate group at a terminal of a molecule in which acid anhydrides are introduced in the main chain thereof by a photopolymerization of a styrene compound having a dithiocarbamate group and maleic anhydride that are coexisting (see Non-Patent Document 7) has been known.

In such a method for producing a hyperbranched polymer by a photopolymerization, expensive and special reaction facilities are required because a light source such as a high-pressure mercury lamp is used.

In addition, a problem of generating a large amount of a gelation product nearby a high-pressure mercury lamp occurs in such a photopolymerization. Therefore, only about 40% of the hyperbranched polymer can be obtained because the polymerization can be performed at a conversion ratio of only about 50% and purification by reprecipitation is repeated due to the large amount of remaining monomers. In addition, a cumbersome operation of removing a gelation product is also required.

Moreover, the photopolymerization also has a problem in which it is difficult to produce a hyperbranched polymer having the same molecular weight and the same degree of branching because the condition setting of the photoreaction is difficult when scaling up the reaction.

As described above, the method for producing a hyperbranched polymer by photopolymerization is difficult to perform in industry. Therefore, an excellent industrial production method has been desired.

Meanwhile, a method for polymerizing monomers having a styryl group and/or an acryl group by heating in the presence of a radical initiator such as a compound having a dithiocarbamate group and azobisisobutyronitrile (AIBN) has been known (see Patent Documents 1, 2, 3 and 4).

In this method, a linear polymer is obtained because the polymerization proceeds at a position of double bond of a styryl group and/or an acryl group.

In addition, an example of polymerization of 4-vinylbenzyl N,N-diethyldithiocarbamate that is a compound in which a dithiocarbamate group and a styryl group coexist in a molecule thereof by heating in the presence of AIBN, similar to the method as described above, has been known (see Non-Patent Document 8).

In this method, a linear polymer is obtained because the polymerization proceeds at a position of double bond of a styryl group.

In addition, Non-Patent Document 8 discloses an example of heating 4-vinylbenzyl N,N-diethyldithiocarbamate at 30° C. in the absence of AIBN. However, almost no reaction proceeds in this example (yield 0.8%).

As described above, there is no example of report in which a hyperbranched polymer is obtained by polymerizing a compound containing a dithiocarbamate group and a polymerizable unsaturated bond group such as a styryl group and/or an acryl group by heating.

Non-Patent Document 1
  Koji Ishizu, Akihide Mori, Macromol. Rapid Commun. 21, 665-668 (2000)
Non-Patent Document 2
  Koji Ishizu, Akihide Mori, Polymer International 50, 906-910 (2001)
Non-Patent Document 3
  Koji Ishizu, Yoshihiro Ohta, Susumu Kawauchi, Macromolecules Vol. 35, No. 9, 3781-3784 (2002)
Non-Patent Document 4
  Koji Ishizu, Takeshi Shibuya, Akihide Mori, Polymer International 51, 424-428 (2002)
Non-Patent Document 5
  Koji Ishizu, Takeshi Shibuya, Susumu Kawauchi, Macromolecules Vol. 36, No. 10, 3505-3510 (2002)
Non-Patent Document 6
  Koji Ishizu, Takeshi Shibuya, Jaebum Park, Satoshi Uchida, Polymer International 53, 259-265 (2004)
Non-Patent Document 7
  Koji Ishizu, Akihide Mori, Takeshi Shibuya, Polymer Vol. 42, 7911-7914 (2001)

Non-Patent Document 8

Takayuki Otsu, Keiji Yamashita, Kazuichi Tsuda, Macromolecules Vol. 19, No. 2, 287-290 (1986)

Patent Document 1

Japanese Translation of PCT International Application No. 2002-508409

Patent Document 2

Japanese Translation of PCT International Application No. 2002-500251

Patent Document 3

Japanese Translation of PCT International Application No. 2004-509181

Patent Document 4

Japanese Patent Application Publication No. JP-A-5-188658

DISCLOSURE OF THE INVENTION

Problem to be Solved by the Invention

In order to solve the problems described above, it is an object of the present invention to provide a method for producing a hyperbranched polymer that has excellent economical efficiency and operationality and can stably be produced in high yield.

Means for Solving the Problem

As a result of an intensive investigation for achieving the above-described objects, the inventors of the present invention have discovered that a hyperbranched polymer is obtained in high yield by heating a compound containing a dithiocarbamate group and a polymerizable unsaturated bond group such as a styryl group and/or an acryl group in a molecule thereof, and have accomplished the present invention.

In addition, the inventors of the present invention have discovered that a hyperbranched polymer having a molecular weight (an absolute molecular weight) and a degree of branching both equal to those of a hyperbranched polymer obtained by a related-art photopolymerization is obtained by adding a disulfide compound, and have accomplished the present invention.

Specifically, the present invention provides:

1. a method for producing a hyperbranched polymer characterized by comprising polymerizing a dithiocarbamate compound of Formula (1):

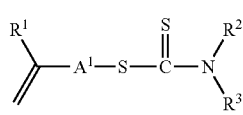

(where $R^1$ is a hydrogen atom or a methyl group; $R^2$ and $R^3$ are individually a $C_{1-5}$ alkyl group, a $C_{1-5}$ hydroxyalkyl group or a $C_{7-12}$ arylalkyl group, or $R^2$ and $R^3$ are optionally bonded to each other to form a ring together with a nitrogen atom; and $A^1$ is Formula (2) and/or Formula (3):

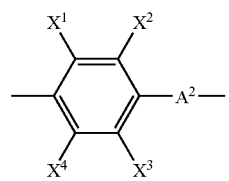

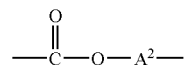

(where $A^2$ is a linear, branched or cyclic $C_{1-30}$ alkylene group that optionally contains an ether bond or an ester bond and $X^1$, $X^2$, $X^3$ and $X^4$ are each independently a hydrogen atom, a $C_{1-20}$ alkyl group, a $C_{1-20}$ alkoxy group, a halogen atom, a nitro group, a hydroxyl group, an amino group, a carboxyl group or a cyano group)) by heating at 50 to 250° C.;

2. the method for producing the hyperbranched polymer according to 1. above, characterized in that the hyperbranched polymer is Formula (4):

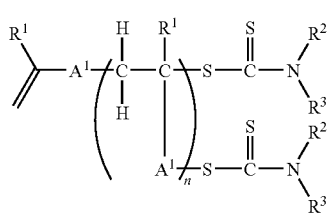

(where $R^1$, $R^2$, $R^3$ and $A^1$ are the same as defined above, and n is the number of repeating unit structures and is an integer of 2 to 1,000,000);

3. the method for producing the hyperbranched polymer according to 1. or 2. above, characterized in that $A^1$ is Formula (6):

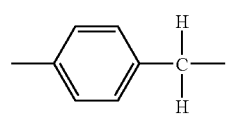

4. the method for producing the hyperbranched polymer according to 1. or 2. above, characterized in that $A^1$ is Formula (7):

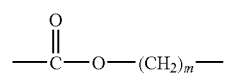

(where m is an integer of 2 to 10);

5. the method for producing the hyperbranched polymer according to any one of 1. to 4. above, characterized by further comprising adding a disulfide compound of formula (8):

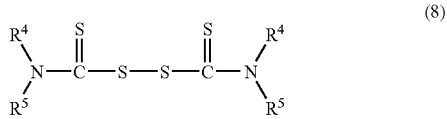

(where $R^4$ and $R^5$ are individually a $C_{1-5}$ alkyl group, a $C_{1-5}$ hydroxyalkyl group or a $C_{7-12}$ arylalkyl group, or $R^4$ and $R^5$ are optionally bonded to each other to form a ring together with a nitrogen atom);

6. the method for producing the hyperbranched polymer according to 5. above, characterized in that an amount of the disulfide compound of Formula (8) to be added is 1 to 3% by mass based on a mass of the dithiocarbamate compound of Formula (1);
7. a method of polymerization, characterized by comprising polymerizing the dithiocarbamate compound of Formula (1) by heating at 50 to 250° C. in the absence of a radical initiator;
8. the method of polymerization according to 7. above, characterized by further comprising adding the disulfide compound of Formula (8);
9. the method of polymerization according to 8. above, characterized in that an amount of the disulfide compound to be added is 1 to 3% by mass based on a mass of the dithiocarbamate compound of Formula (1); and
10. a product obtained by the method of polymerization according to any one of 7. to 9. above.

Effects of the Invention

According to the method for producing the hyperbranched polymer according to the present invention, a light source (a high-pressure mercury lamp) that is essential in the photopolymerization is not required because the hyperbranched polymer can stably be obtained in high yield by heating a compound containing a dithiocarbamate group and a polymerizable unsaturated bond group such as a styryl group and/or an acryl group. Therefore the method is economically advantageous.

In addition, a conversion ratio of the polymerization can be increased up to about 90% and an obtained yield is about two times that of the photopolymerization, because a gelation product that is the problem in photopolymerization is not generated. The process can be simplified, because removal of the gelation product is also not required.

Considering that the obtained yield is about two times of that of the photopolymerization, a production efficiency in the method for producing the hyperbranched polymer according to the present invention can be increased in about four times, because a polymerization rate of the method is about two times of that of the photopolymerization.

In addition, the method for producing the hyperbranched polymer according to the present invention is suitable for mass production, because unlike the photopolymerization, similar hyperbranched polymers can be produced even when production is scaled up.

The method for producing the hyperbranched polymer according to the present invention that has characteristics as described above is a quite useful method as a practical industrial manufacturing process.

In addition, according to the method for producing the hyperbranched polymer according to the present invention, the hyperbranched polymer is also stably obtained in high yield in a similar way when the disulfide compound of Formula (8) is added as an additive.

When the disulfide compound is added, a molecular weight and a degree of branching of the hyperbranched polymer can be controlled, and the molecular weight and the degree of branching can be similar to those of a hyperbranched polymer obtained by photopolymerization.

Generally, it has been known that the disulfide compound has an effect to reduce a molecular weight of a polymer generated. Moreover, in the method for producing the hyperbranched polymer according to the present invention, the disulfide compound also has an effect to increase the degree of branching of the hyperbranched polymer.

Therefore, the hyperbranched polymer having a wide-ranging average molecular weight, from a low average molecular weight to a high average molecular weight, and a wide-ranging degree of branching can be produced by employing these production methods.

BEST MODES FOR CARRYING OUT THE INVENTION

The present invention is described below in further detail.

The method for producing a hyperbranched polymer according to the present invention is a method for producing a hyperbranched polymer by polymerizing a compound containing a dithiocarbamate group and a polymerizable unsaturated bond group such as a styryl group and/or an acryl group in a molecule thereof by heating.

The compound containing a dithiocarbamate group and a polymerizable unsaturated bond group such as a styryl group and/or an acryl group in a molecule thereof is not particularly limited. However, the dithiocarbamate compound of Formula (1) is preferably used.

In Formula (1), $R^1$ is a hydrogen atom or a methyl group, and $R^2$ and $R^3$ are individually a $C_{1-5}$ alkyl group, a $C_{1-5}$ hydroxyalkyl group or a $C_{7-12}$ arylalkyl group. In addition, $R^2$ and $R^3$ may be bonded to each other to form a ring together with a nitrogen atom.

Examples of the $C_{1-5}$ alkyl groups include a methyl group, an ethyl group, an isopropyl group, a t-butyl group, a cyclopentyl group and a normal pentyl group. Examples of the $C_{1-5}$ hydroxyalkyl groups include a hydroxymethyl group, a hydroxyethyl group and a hydroxypropyl group. Examples of the $C_{7-12}$ arylalkyl groups include a benzyl group and a phenethyl group.

Examples of the ring formed from $R^2$ and $R^3$ that are bonded to each other together with a nitrogen atom include a 4- to 8-membered ring. In addition, a ring containing 4 to 6 methylene groups is included as the ring. Moreover, a ring containing an oxygen atom or a sulfur atom and 4 to 6 methylene groups is included as the ring. Specific examples of the ring formed from $R^2$ and $R^3$ that are bonded to each other together with a nitrogen atom include a piperidine ring, a pyrrolidine ring, a morpholine ring, a thiomorpholine ring and a homopiperidine ring.

In addition, in Formula (1), $A^1$ is a structure of Formula (2) and/or Formula (3).

In Formula (2) and Formula (3), $A^2$ is a linear, branched or cyclic $C_{1-30}$ alkylene group that may contain an ether bond or an ester bond, and $X^1$, $X^2$, $X^3$ and $X^4$ are individually a hydrogen atom, a $C_{1-20}$ alkyl group, a $C_{1-20}$ alkoxy group, a halogen atom, a nitro group, a hydroxyl group, an amino group, a carboxyl group or a cyano group.

Specific examples of the alkylene group $A^2$ include a linear alkylene such as methylene, ethylene, normal propylene, normal butylene and normal hexylene, and a branched alkylene such as isopropylene, isobutylene and 2-methylpropylene. In addition, examples of the cyclic alkylene include a $C_{3-30}$ alicyclic aliphatic group of a monocyclic, polycyclic or crosslinked cyclic structure. Specific examples of the cyclic alkylene include groups of a monocyclo, bicyclo, tricyclo, tetracyclo or pentacyclo structure having 4 or more carbon atoms. For example, structural examples (a) to (s) of the alicyclic part in the alicyclic aliphatic group are shown as follows.

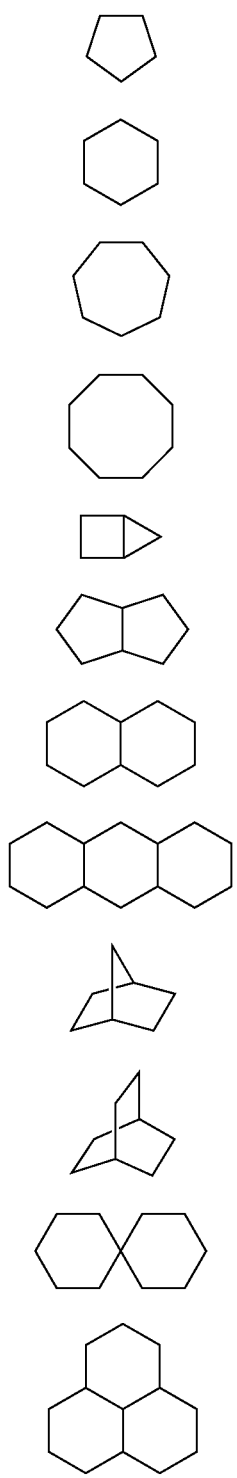

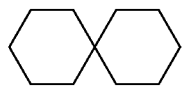

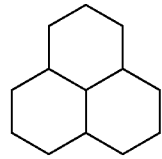

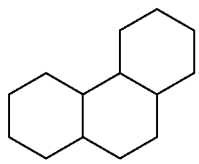

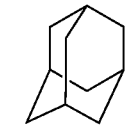

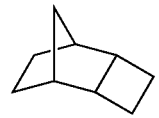

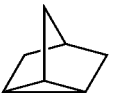

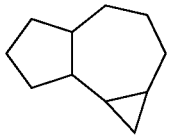

In addition, examples of the $C_{1-20}$ alkyl group of $X^1$, $X^2$, $X^3$ and $X^4$ include a methyl group, an ethyl group, an isopropyl group, a cyclohexyl group and a normal pentyl group. Examples of the $C_{1-20}$ alkoxy group include a methoxy group, an ethoxy group, an isopropoxy group, a cyclohexyloxy group and a normal pentyloxy group. Examples of the halogen atom include a fluorine atom, a chlorine atom, a bromine atom and an iodine atom. Preferable examples of $X^1$, $X^2$, $X^3$ and $X^4$ include a hydrogen atom and a $C_{1-20}$ alkyl group.

In addition, a structure of Formula (6) or Formula (7) is preferable for $A^1$ of Formula (1). In Formula (7), m is an integer of 2 to 10 and 2 or 3 is preferable for m.

The compound of Formula (1) can easily be obtained by a nucleophilic substitution reaction of a compound of Formula (9) with a compound of Formula (10).

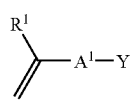

(9)

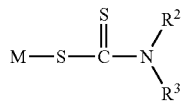

(10)

In Formula (9), $R^1$ and $A^1$ are the same as defined above and Y is a leaving group. Examples of the leaving group include a fluorine atom, a chlorine atom, a bromine atom, an iodine atom, a mesyl group and a tosyl group. In Formula (10), $R^2$ and $R^3$ are the same as defined above, and examples of M include lithium, sodium and potassium.

Usually, the nucleophilic substitution reaction is preferably performed in an organic solvent that can dissolve both of the two types of compounds. After the completion of the reaction, the compound of Formula (1) can be obtained in a high purity by liquid separation treatment using a water/nonaqueous organic solvent or by recrystallization treatment.

The compound of Formula (1) can be produced by referring the methods described in WO 2006/093050 Pamphlet; Macromol. Rapid Commun. 21, 665-668 (2000); or Polymer International 51, 424-428 (2002).

Specific examples of the compound of Formula (1) include N,N-diethyldithiocarbamylmethylstyrene and N,N-diethyldithiocarbamylethyl methacrylate.

The hyperbranched polymer of Formula (4) obtained by the production method according to the present invention takes a structure in which a repeating unit structure of Formula (12) is linked to a structure of Formula (11) at an initiation site having a vinyl group.

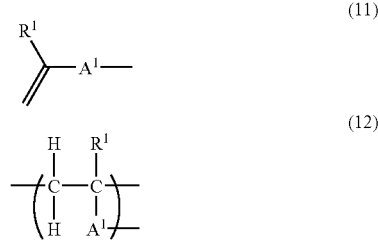

(where $R^1$ and $A^1$ are the same as defined above)

The structures in which the repeating units of Formula (12) are linked by themselves include the case of a branched structure of Formula (5) and the case of a linear structure of Formula (13). Both of the structures are encompassed in the present invention. In other words, the hyperbranched polymer of Formula (4) contains at least one structure of Formula (5):

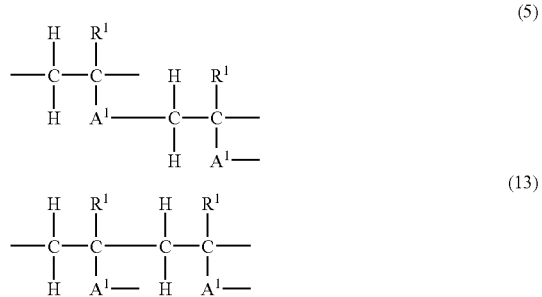

(where $R^1$ and $A^1$ are the same as defined above).

In the hyperbranched polymer of Formula (4), its terminal is basically a dithiocarbamate group.

It is considered that the hyperbranched polymer of Formula (4) has the cases that the repeating unit structure thereof is single or in combination of two or more. Both cases may be encompassed in the present invention. In addition, for example, when the repeating unit structure has two structures, in other words, the hyperbranched polymer is a copolymer, a sequence manner of the copolymer may be any of a random copolymer, an alternating copolymer, a block copolymer and a graft copolymer.

In addition, in the method for producing the hyperbranched polymer according to the present invention, the disulfide compound of Formula (8) may be used as an additive.

In Formula (8), $R^4$ and $R^5$ are individually a $C_{1-5}$ alkyl group, a $C_{1-5}$ hydroxyalkyl group or a $C_{7-12}$ arylalkyl group. In addition, $R^4$ and $R^5$ may be bonded to each other to form a ring together with a nitrogen atom.

Examples of the $C_{1-5}$ alkyl groups include a methyl group, an ethyl group, an isopropyl group, a t-butyl group, a cyclopentyl group and a normal pentyl group. Examples of the $C_{1-5}$ hydroxyalkyl groups include a hydroxymethyl group, a hydroxyethyl group and a hydroxypropyl group. Examples of the $C_{7-12}$ arylalkyl groups include a benzyl group and a phenethyl group.

Examples of the ring formed from $R^4$ and $R^5$ that are bonded to each other together with a nitrogen atom include a 4- to 8-membered ring. In addition, a ring containing 4 to 6 methylene groups is included as the ring. Moreover, a ring containing an oxygen atom or a sulfur atom and 4 to 6 methylene groups is included as the ring. Specific examples of the ring formed from $R^4$ and $R^5$ that are bonded to each other together with a nitrogen atom include a piperidine ring, a pyrrolidine ring, a morpholine ring, a thiomorpholine ring and a homopiperidine ring.

Specific examples of the compound of Formula (8) include tetramethylthiuram disulfide, tetraethylthiuram disulfide, tetrabutylthiuram disulfide and dipentamethylenethiuram disulfide.

The hyperbranched polymer of Formula (4) has a weight average molecular weight Mw, measured by gel permeation chromatography in a converted molecular weight as polystyrene (relative molecular weight), of 500 to 5,000,000, or 1,000 to 1,000,000, or 2,000 to 500,000, or 3,000 to 100,000. The degree of distribution that is a ratio of Mw (weight average molecular weight)/Mn (number average molecular weight) of the hyperbranched polymer is 1.0 to 7.0, or 1.1 to 6.0, or 1.2 to 5.0.

Reaction conditions of the production method of the hyperbranched polymer according to the present invention is described.

The method for producing the hyperbranched polymer according to the present invention can be performed by a heretofore known polymerization form such as a bulk polymerization, a solution polymerization, a suspension polymerization and an emulsion polymerization. Among these, the solution polymerization is preferable.

In the method for producing the hyperbranched polymer according to the present invention, hyperbranched polymers having a different molecular weight (a relative molecular weight and an absolute molecular weight) and a different degree of branching are obtained depending on the reaction conditions.

Here, in the present specification, a degree of branching=absolute molecular weight Mw/relative molecular weight Mn, and a solution viscosity are used as an index of a degree of branching.

A ratio of absolute molecular weight and relative molecular weight is used as the degree of branching (degree of branching=absolute molecular weight Mw/relative molecular weight Mw), and is defined in the present specification as an index of the degree of branching based on the description of "Many hyperbranched polymers are slowly eluted compared with the polystyrene having an equal molecular weight in gel permeation chromatography analysis. This indicates that hyperbranched polymers have more compact shape than linear polymers in a solution" in "*BUNKIPORIMA NO NANOTEKUNOROJI—JISEDAI KOUBUNNSI ZAIRYOU NO SENNRYAKU SEKKEI* (Nanotechnology of Branched Polymer—Design Strategy of Next Generation Polymer Material) page 130, edited by Kouji Ishizu and published by Industrial Publishing & Consulting, Inc.".

Here, it is defined that the absolute molecular weight Mw is a weight average molecular weight obtained by GPC-MALS measurement and the relative molecular weight is a weight average molecular weight obtained by gel permeation chromatography (a converted molecular weight as polystyrene) in the present specification.

In addition, it is described in the document (page 96) that a hyperbranched polymer generally has a lower solution viscosity than a linear polymer with the same molecular weight. Therefore, the solution viscosity is also measured and compared in the present specification as the index of the degree of branching.

In other words, in the same absolute molecular weight Mw, it is determined that the higher the value of the degree of branching and the lower the solution viscosity, the more the branching exists.

Hereinafter, reaction conditions in the solution polymerization are described in the case of adding the disulfide compound of Formula (8) and in the case of not adding, separately.

<Case of not Adding the Disulfide Compound>

Various solvents used in related-art in organic synthesis can be used as the solvent as long as the solvent does not have an adverse effect on the reaction. Such a solvent is not particularly limited as long as the solvent can dissolve the compound of Formula (1).

Specific examples of the solvent include aprotic polar organic solvents (N,N-dimethylformamide, dimethyl sulfoxide, dimethylacetamide, tetramethylurea, sulfolane, N-methylpyrrolidone, N,N-dimethylimidazolidinone and the like), ethers (diisopropyl ether, t-butyl methyl ether, tetrahydrofuran, 1,4-dioxane and the like), aliphatic hydrocarbons (hexane, cyclohexane, octane, decane, decalin, petroleum ether and the like), aromatic hydrocarbons (benzene, chlorobenzene, o-dichlorobenzene, nitrobenzene, toluene, xylene, mesitylene, tetralin and the like), halogenated hydrocarbons (chloroform, dichloromethane, 1,2-dichloroethane, carbon tetrachloride and the like), ketones (acetone, methyl ethyl ketone, methyl butyl ketone, methyl isobutyl ketone, cyclohexanone and the like), alkoxy alkanes (dimethoxyethane, diethoxyethane, diglyme and the like). These solvents may be used individually or in combination of two or more types thereof.

Among these solvents, aromatic hydrocarbons, aprotic polar organic solvents, ketones and alkoxy alkanes are preferable, in consideration of solubility of substrates being raw materials and additives, safety, cost, and easiness of isolation and purification.

Specific examples of the solvent include xylene, o-dichlorobenzene, cyclohexanone and diglyme.

The reaction temperature is usually 50 to 250° C., preferably 80 to 200° C., and more preferably 100 to 150° C.

The concentration of the compound of Formula (1) is optional. For example, the concentration is 1 to 99% by mass, or 10 to 95% by mass, or 30 to 90% by mass.

The polymerization time is, for example, 0.1 to 100 hours, or 0.5 to 30 hours, or 1 to 15 hours. Usually, a conversion ratio of the compound of Formula (1) increases over the course of the polymerization time.

Here, the polymerization can usually be performed under an atmosphere of an inert gas such as nitrogen and argon, under normal pressure or increased pressure.

The absolute molecular weight Mw of the obtained hyperbranched polymer is, for example, 25,000 to 200,000 or 30,000 to 150,000.

The obtained hyperbranched polymer can be separated from the solvent out of the reaction solution by distilling-off the solvent or by solid-liquid separation. Also, by adding the reaction solution to a poor solvent, the hyperbranched polymer can be precipitated to be recovered as a powder.

<Case of Adding the Disulfide Compound>

Similar solvents used in the case of not adding the disulfide compound can be used as solvents.

Among these solvents, aromatic hydrocarbons, aprotic polar organic solvents, ketones and alkoxy alkanes are preferable, in consideration of solubility of substrates being raw materials and additives, safety, cost, and easiness of isolation and purification.

Specific examples of the solvent include xylene, cyclohexanone and N-methylpyrrolidone (hereinafter called NMP).

The amount of the added disulfide compound of Formula (8) based on a mass of the dithiocarbamate compound of Formula (1) is optional. For example, the amount is 0.1 to 20% by mass, or 1 to 10% by mass.

The amount is preferably 1 to 3% by mass, in consideration of the molecular weight (a relative molecular weight and an absolute molecular weight), the degree of branching and the solution viscosity of the hyperbranched polymer obtained.

The reaction temperature is usually 50 to 250° C., and preferably 80 to 200° C. The temperature is more preferably 100 to 150° C., in consideration of the molecular weight (a relative molecular weight and an absolute molecular weight), the degree of branching and the solution viscosity of the hyperbranched polymer obtained.

The concentration of the compound of Formula (1) is optional. For example, the concentration is 1 to 99% by mass, or 10 to 95% by mass, or 30 to 90% by mass.

The polymerization time is, for example, 0.1 to 100 hours, or 0.5 to 30 hours, or 1 to 15 hours. Usually, a conversion ratio of the compound of Formula (1) increases over the course of the polymerization time.

Here, the polymerization can usually be performed under an atmosphere of an inert gas such as nitrogen and argon, under normal pressure or increased pressure.

The absolute molecular weight Mw of the obtained hyperbranched polymer is, for example, 3,000 to 50,000 when the amount of the disulfide compound of Formula (8) to be added based on a mass of the dithiocarbamate compound of Formula (1) is 1 to 10% by mass.

Operations similar to the case of not adding the disulfide compound can be performed for separation from the solvent and recovery of the hyperbranched polymer.

In addition, the present invention also provides a method for polymerizing a dithiocarbamate compound containing a polymerizable unsaturated bond group such as a styryl group and/or an acryl group in the absence of a radical initiator by heating.

The compound containing a dithiocarbamate group and a polymerizable unsaturated bond group such as a styryl group and/or an acryl group in the molecule is not particularly limited. However, the dithiocarbamate compound of Formula (1) is preferably used.

In addition, the disulfide compound of Formula (8) may be added in the polymerization method according to the present invention.

Reaction conditions of the polymerization method according to the present invention are the same as the reaction conditions of the production method of the hyperbranched polymer.

EXAMPLES

Hereinafter, the present invention is described more specifically referring to examples. However, the present invention is not limited to these examples at all.

In the following examples, for measurement of physical properties of a sample, the following apparatuses were used.
Liquid Chromatography
  Apparatus: manufactured by Agilent; 1100 Series
  Column: Inertsil ODS-2
  Column temperature: 40° C.
  Solvent: Acetonitrile/water=60/40 (volume ratio)
  Detector: UV-254 nm, RI
Gel Permeation Chromatography
  Apparatus: manufactured by Tosoh Corporation; HLC-8220GPC
  Column: Shodex KF-804L+KF-803L
  Column temperature: 40° C.
  Solvent: Tetrahydrofuran
  Detector: UV-254 nm, RI
GPC-MALS for Absolute Molecular Weight
  Apparatus: Wyatt DAWN HELEOS
  Measurement Temp.: 40° C.
Viscosity Measurement
  Apparatus: manufactured by TOKI SANGYO CO., LTD.; VISCOMETER TV-22 TV-L
$^1$H-NMR Spectrum
  Apparatus: manufactured by JEOL DATUM LTD.; JNM-LA400
  Solvent: $CDCl_3$
  Internal Standard Tetramethylsilane
Element Analysis (Carbon, Hydrogen, Nitrogen)
  Apparatus: manufactured by PerkinElmer Co., Ltd.; PE2400II
  Combustion tube temp.: 975° C.
Element Analysis (sulfur)
  Apparatus: manufactured by Thermo Finnigan Corp.; Flash EA1112
  Combustion tube temp.: 1000° C.
Thermogravimetric Analysis
  Apparatus: manufactured by Seiko Instruments & Electronics Ltd.; TG/DTA320
  Temperature elevation rate: 10° C./min
  Air supply: 300 ml/min Reference Example 1

<Synthesis of N,N-diethyldithiocarbamylmethylstyrene>

In a 2-L reaction flask, 120 g of chloromethylstyrene (manufactured by Seimi Chemical Co., Ltd.; trade name: CMS-14), 181 g of sodium N,N-diethyldithiocarbamate trihydrate (manufactured by Kanto Chemical Co., Inc.) and 1400 g of acetone were charged, and the reaction mixture was reacted at a temperature of 40° C. for 1 hour with stirring. After the completion of the reaction, deposited sodium chloride was filtered to be removed, and then acetone was distilled off from the reaction solution using an evaporator to produce a reaction crude powder. The obtained reaction crude powder was redissolved in toluene and the resultant liquid was separated in toluene/water. Thereafter, in a refrigerator having a temperature of −20° C., an objective was recrystallized from the toluene phase. The recrystallized substance was filtered and vacuum-dried to produce 206 g (yield; 97%) of an objective white powder. The purity (area percentage) was 100% as measured by liquid chromatography. Melting point: 56° C.

Examples

Thermal Polymerization

<Synthesis of Styrene-Based Hyperbranched Polymer HPS Having a Dithiocarbamate Group at a Molecule Terminal Thereof>

Example 1

Case of not Adding a Disulfide Compound (Tetraethylthiuram Disulfide (Manufactured by Kanto Chemical Co., Inc.); Hereinafter called DCDC)

In a 100-mL reaction flask, 6 g of N,N-diethyldithiocarbamylmethylstyrene (hereinafter called S-DC) and 4 g of xylene were charged and the mixture was completely dissolved with stirring. Nitrogen purge was performed with stirring, and the reaction flask was placed into an oil bath. The flask was heated until the temperature of the inside of the flask reached to 140° C. After 3 hours (the measurement was started at the time when the temperature of the inside of the flask reached to 140±5° C.), the reaction flask was taken out from the oil bath. After cooling to the room temperature, 20 g of xylene was charged. The conversion ratio at this moment was 64% (The reaction was terminated at a conversion ratio of about 50 to 60% as a rough target so as to enable this conversion ratio be compared with a conversion ratio of the photopolymerization (Comparative Example 1) described below). The reaction solution was subjected to reprecipitation purification using 300 g of methanol, and then filtered under reduced pressure to produce a white solid. The obtained solid was redissolved with 20 g of xylene and subjected to reprecipitation purification using 600 g of methanol and then filtered under reduced pressure and vacuum-dried to produce 3.6 g of an objective white powder (HPS). The weight average molecular weight Mw that is a relative molecular weight measured by gel permeation chromatography (hereinafter called GPC) in a converted molecular weight as polystyrene was 40,000 and the degree of distribution Mw/Mn was 2.4. When an absolute molecular weight was measured, the weight average molecular weight Mw was 78,000.

The degree of branching was 1.95 in this measurement.

Viscosity was measured as follows. A homogeneous solution of 0.6 g of HPS and 0.9 g of toluene (a toluene solution of 40% by mass) was prepared and a viscosity was measured. The viscosity was 96 mPa·s at a measuring temperature of 20° C.

Examples 2 to 5

HPSs were obtained in a similar manner to Example 1 except that the polymerization temperature of 140° C. was changed to the temperatures shown in Table 1.

TABLE 1

Polymerization temperature

| Example | Temperature (°C.) | Polymerization time (hr) | Conversion ratio (%) | Molecular weight (Mw) Relative | Molecular weight (Mw) Absolute | Degree of branching | Viscosity (mPa·s) |
| --- | --- | --- | --- | --- | --- | --- | --- |
| 2 | 60  | 25 | 44 | 180,000 | 340,000 | 1.89 | 787 |
| 3 | 80  | 25 | 48 | 16,000  | 29,000  | 1.81 | 39  |
| 4 | 100 | 7  | 50 | 57,000  | 100,000 | 1.75 | 164 |
| 5 | 120 | 5  | 60 | 52,000  | 100,000 | 1.92 | 118 |
| 1 | 140 | 3  | 64 | 40,000  | 78,000  | 1.95 | 96  |

Examples 6 to 8

HPSs were obtained in a similar manner to Example 1 except that the polymerization solvent of xylene was changed to the solvents shown in Table 2.

TABLE 2 polymerization solvent

| Example | Solvent | Polymerization time (hr) | Conversion ratio (%) | Molecular weight (Mw) Relative | Molecular weight (Mw) Absolute | Degree of branching | Viscosity (mPa·s) |
| --- | --- | --- | --- | --- | --- | --- | --- |
| 1 | Xylene        | 3   | 64 | 40,000 | 78,000 | 1.95 | 96 |
| 6 | Cyclohexanone | 3   | 67 | 44,000 | 83,000 | 1.89 | 59 |
| 7 | Diglyme       | 1.5 | 58 | 35,000 | 63,000 | 1.80 | 63 |
| 8 | ODB           | 2   | 72 | 45,000 | 88,000 | 1.96 | 72 |

ODB: o-Dichlorobenzene

Examples 9 to 14

In a 100-mL reaction flask, S-DC and xylene were charged and stirred so that the total weight thereof was 10 g and the concentration of S-DC was shown in Table 3. Nitrogen purge was performed with stirring, and the reaction flask was placed into an oil bath. The flask was heated until the temperature of the inside of the flask reached to 140° C., and the time when the temperature of the inside of the flask reached to 140±5° C. was regarded as the starting point of the polymerization. When the conversion ratio became about 50 to 60% as a rough target, the reaction flask was taken out from the oil bath. After cooling to the room temperature, 20 g of xylene was charged. The reaction solution was subjected to reprecipitation purification using 300 g of methanol and then filtered under reduced pressure to produce a white solid. The obtained solid was redissolved with 20 g of xylene and subjected to reprecipitation purification using 600 g of methanol and then filtered under reduced pressure and vacuum-dried to produce an objective white powder (HPS).

TABLE 3

Polymerization concentration

| Example | Concentration (% by mass) | Polymerization time (hr) | Conversion ratio (%) | Molecular weight (Mw) Relative | Molecular weight (Mw) Absolute | Degree of branching | Viscosity (mPa·s) |
| --- | --- | --- | --- | --- | --- | --- | --- |
| 9  | 30 | 7 | 57 | 25,000 | 46,000  | 1.84 | 67  |
| 10 | 40 | 4 | 54 | 29,000 | 54,000  | 1.86 | 68  |
| 11 | 50 | 4 | 62 | 34,000 | 66,000  | 1.94 | 77  |
| 1  | 60 | 3 | 64 | 40,000 | 78,000  | 1.95 | 96  |
| 12 | 70 | 2 | 67 | 45,000 | 90,000  | 2.00 | 168 |
| 13 | 80 | 1 | 57 | 50,000 | 95,000  | 1.90 | 101 |
| 14 | 90 | 1 | 70 | 68,000 | 150,000 | 2.21 | 132 |

Example 15

Case of Adding a Disulfide Compound (DCDC)

In a 100-mL reaction flask, 6 g of S-DC, 4 g of xylene and 0.06 g of DCDC (1% by mass based on the mass of S-DC) were charged, and the mixture was completely dissolved with stirring. Nitrogen purge was performed with stirring, and the reaction flask was placed into an oil bath. The flask was heated until the temperature of the inside of the flask reached to 140° C., and the time when the temperature of the inside of the flask reached to 140±5° C. was regarded as the starting point of the polymerization. When the conversion ratio became about 50 to 60% as a rough target, the reaction flask was taken out from the oil bath. After cooling to the room temperature, 20 g of xylene was charged. The reaction solution was subjected to reprecipitation purification using 300 g of methanol and then filtered under reduced pressure to produce a white solid. The obtained solid was redissolved with 20 g of xylene and subjected to reprecipitation purification using 600 g of methanol, and then filtered under reduced pressure and vacuum-dried to produce 3.6 of an objective white powder. The weight average molecular weight Mw that is a relative molecular weight measured by GPC in a converted molecular weight as polystyrene was 21,000, and the degree of distribution Mw/Mn was 2.4. When an absolute molecular weight was measured, the weight average molecular weight Mw was 42,000.

The degree of branching was 2.00 in this measurement.

Viscosity was measured as follows. A homogeneous solution of 0.6 g of HPS and 0.9 g of toluene (a toluene solution of 40% by mass) was prepared and a viscosity was measured. The viscosity was 46 mPa·s at a measuring temperature of 20° C.

Examples 16 to 20

HPSs were obtained in a similar manner to Example 15 except that the amount of added DCDC was changed to the amounts shown in Table 4.

Examples 21 to 22

In a 100-mL reaction flask, S-DC and xylene were charged so that the total weight thereof was 10 g and the concentration of S-DC was shown in Table 5, and further DCDC was charged so that the concentration of DCDC of 1% by mass based on the mass of S-DC, and the mixture was stirred. Nitrogen purge was performed with stirring, and the reaction flask was placed into an oil bath. The flask was heated until the temperature of the inside of the flask reached to 140° C., and the time when the temperature of the inside of the flask reached to 140±5° C. was regarded as the starting point of the polymerization. When the conversion ratio became about 50 to 60% as a rough target, the reaction flask was taken out from the oil bath. After cooling to the room temperature, 20 g of xylene was charged. The reaction solution was subjected to reprecipitation purification using 300 g of methanol and then filtered under reduced pressure to produce a white solid. The obtained solid was redissolved with 20 g of xylene and subjected to reprecipitation purification using 600 g of methanol, and then filtered under reduced pressure and vacuum-dried to produce an objective white powder (HPS).

TABLE 4

Amount of added DCDC

| Example | Amount of added DCDC (% by mass) | Polymerization time (hr) | Conversion ratio (%) | Molecular weight (Mw) Relative | Molecular weight (Mw) Absolute | Degree of branching | Viscosity (mPa·s) |
|---|---|---|---|---|---|---|---|
| 1 | 0 | 3 | 64 | 40,000 | 78,000 | 1.95 | 96 |
| 16 | 0.1 | 3 | 62 | 35,000 | 69,000 | 1.97 | 79 |
| 17 | 0.5 | 3 | 69 | 30,000 | 60,000 | 2.00 | 58 |
| 15 | 1 | 3 | 64 | 21,000 | 42,000 | 2.00 | 46 |
| 18 | 2 | 3 | 62 | 15,000 | 29,000 | 1.93 | 42 |
| 19 | 3 | 3 | 74 | 13,000 | 24,000 | 1.85 | 38 |
| 20 | 10 | 3 | 73 | 3,900 | 6,400 | 1.64 | 10 |

TABLE 5

Polymerization concentration

| Example | Concentration (% by mass) | Polymerization time (hr) | Conversion ratio (%) | Molecular weight (Mw) Relative | Molecular weight (Mw) Absolute | Degree of branching | Viscosity (mPa·s) |
|---|---|---|---|---|---|---|---|
| 21 | 50 | 3 | 56 | 24,000 | 44,000 | 1.83 | 47 |
| 15 | 60 | 3 | 64 | 21,000 | 42,000 | 2.00 | 46 |
| 22 | 70 | 1 | 57 | 21,000 | 39,000 | 1.86 | 50 |

Example 23 to 24

HPSs were obtained in a similar manner to Example 15 except that the polymerization solvent of xylene was changed to the solvents shown in Table 6.

TABLE 6

| | | | | Molecular weight (Mw) | | | |
|---|---|---|---|---|---|---|---|
| Example | Solvent | Polymerization time (hr) | Conversion ratio (%) | Relative | Absolute | Degree of branching | Viscosity (mPa · s) |
| 15 | Xylene | 3 | 64 | 21,000 | 42,000 | 2.00 | 46 |
| 23 | Cyclohexanone | 3 | 60 | 27,000 | 47,000 | 1.74 | 51 |
| 24 | NMP | 3 | 72 | 33,000 | 69,000 | 2.09 | 62 |

Example 25 to 28

HPSs were obtained in a similar manner to Example 15 except that the polymerization temperature of 140° C. was changed to the temperatures shown in Table 7.

TABLE 7

Polymerization temperature

| | | | | Molecular weight (Mw) | | | |
|---|---|---|---|---|---|---|---|
| Example | Temperature (° C.) | Polymerization time (hr) | Conversion ratio (%) | Relative | Absolute | Degree of branching | Viscosity (mPa · s) |
| 25 | 60 | 25 | 26 | 34,000 | 64,000 | 1.88 | 60 |
| 26 | 80 | 25 | 23 | 24,000 | 41,000 | 1.71 | 48 |
| 27 | 100 | 3 | 59 | 20,000 | 37,000 | 1.85 | 44 |
| 28 | 120 | 3 | 60 | 20,000 | 37,000 | 1.85 | 43 |
| 15 | 140 | 3 | 64 | 21,000 | 42,000 | 2.00 | 46 |

Example 29

Determination of Mass Balance in Quantity Synthesis

In a 5,000-mL reaction flask, 595 g of S-DC, 255 g of xylene and 11.9 g of DCDC (2% by mass based on the mass of S-DC) were charged, and the mixture was completely dissolved with stirring. Nitrogen purge was performed with stirring, and the reaction flask was placed into an oil bath. The flask was heated until the temperature of the inside of the flask reached to 120° C., and the time when the temperature of the inside of the flask reached to 120±5° C. was regarded as the starting point of the polymerization. After 12 hours, the reaction flask was taken out from the oil bath. After cooling to the room temperature, 5.1 kg of cyclohexanone was charged. The conversion ratio at this moment was 90%. The reaction solution was subjected to reprecipitation purification using 29.8 kg of methanol and then filtered under reduced pressure to produce a white solid. The obtained solid was redissolved with 4.5 kg of cyclohexanone and subjected to reprecipitation purification using 25 kg of methanol and then filtered under reduced pressure and vacuum-dried to produce 476 g of an objective white powder (HPS). The obtained yield was 80%. The weight average molecular weight Mw that is a relative molecular weight measured by GPC in a converted molecular weight as polystyrene was 20,000 and the degree of distribution Mw/Mn was 2.4. When an absolute molecular weight was measured, the weight average molecular weight Mw was 39,000.

The degree of branching was 1.95 in this measurement.

Viscosity was measured as follows. A homogenous solution of 0.6 g of HPS and 0.9 g of toluene (a toluene solution of 40% by mass) was prepared and a viscosity was measured. The viscosity was 44 mPa·s at a measuring temperature of 20° C.

Reference Example 2

<Synthesis of N,N-diethyldithiocarbamylethyl Methacrylate>

In a 2-L reaction flask, 100 g of chloroethyl methacrylate (manufactured by Lancaster Ltd.), 178 g of sodium N,N-diethyldithiocarbamate trihydrate (manufactured by Kanto Chemical Co., Inc.) and 1,100 g of acetone were charged, and the resultant mixture was reacted at a temperature of 40° C. for 14 hours with stirring. After the completion of the reaction, deposited sodium chloride was filtered to be removed, and then acetone was distilled off from the reaction solution using an evaporator to produce a reaction crude powder. The obtained reaction crude powder was redissolved in 1,2-dichloroethane and the resultant liquid was separated in 1,2-dichloroethane/water. Thereafter, 1,2-dichloroethane was distilled off from the 1,2-dichloroethane phase to produce 171 g (yield; 97%) of an objective yellow liquid. The purity (area percentage) was 96% as measured by liquid chromatography.

<Synthesis of Acryl-Based Hyperbranched Polymer Having a Dithiocarbamate Group at a Molecule Terminal Thereof>

Example 30

Case of not Adding a Disulfide Compound (DCDC)

In a 100-mL reaction flask, 2 g of N,N-diethyldithiocarbamylethyl methacrylate (hereinafter called EMA-DC) and 3 g of NMP were charged and completely dissolved with stirring. Nitrogen purge was performed with stirring, and the reaction flask was placed into an oil bath. The flask was heated until the temperature of the inside of the flask reached to 100° C., and the time when the temperature of the inside of the flask reached to 100±5° C. was regarded as the starting point of the polymerization. After 5 hours, the reaction flask was taken out from the oil bath. After cooling to the room temperature, 5 g of NMP was charged. The conversion ratio at this moment was 66%. The reaction solution was subjected to reprecipitation purification using 100 g of methanol, and then filtered under reduced pressure to produce a white solid. The obtained solid was redissolved with 5 g of NMP and subjected to reprecipitation purification using 100 g of methanol and then filtered under reduced pressure and vacuum-dried to produce 0.6 of an objective white powder (HPEMA). The weight average molecular weight Mw that is a relative molecular weight measured by GPC in a converted molecular weight as polystyrene was 68,000, and the degree of distribution Mw/Mn was 2.6. When an absolute molecular weight was measured, the weight average molecular weight Mw was 110,000.

The degree of branching was 1.62 in this measurement.

Viscosity was measured as follows. A homogeneous solution of 0.6 g of HPEMA and 0.9 g of toluene (a toluene solution of 40% by mass) was prepared and a viscosity was measured. The viscosity was 1,113 mPa·s at a measuring temperature of 20° C.

Example 31

Case of Adding a Disulfide Compound (DCDC)

In a 100-mL reaction flask, 6 g of EMA-DC, 9 g of NMP and 0.06 g of DCDC (1% by mass based on the mass of EMA-DC) were charged and completely dissolved with stirring. Nitrogen purge was performed with stirring, and the reaction flask was placed into an oil bath. The flask was heated until the temperature of the inside of the flask reached to 100° C., and the time when the temperature of the inside of the flask reached to 100±5° C. was regarded as the starting point of the polymerization. After 16 hours, the reaction flask was taken out from the oil bath. After cooling to the room temperature, 45 g of NMP was charged. The conversion ratio at this moment was 50%. The reaction solution was subjected to reprecipitation purification using 600 g of methanol and then filtered under reduced pressure to produce a white solid. The obtained solid was redissolved with 55 g of NMP and subjected to reprecipitation purification using 600 g of methanol, and then filtered under reduced pressure and vacuum-dried to produce 3 g of an objective white powder (HPEMA). The weight average molecular weight Mw that is a relative molecular weight measured by GPC in a converted molecular weight as polystyrene was 42,000, and the degree of distribution Mw/Mn was 2.5. When an absolute molecular weight was measured, the weight average molecular weight Mw was 65,000.

The degree of branching was 1.55 in this measurement.

Viscosity was measured as follows. A homogeneous solution of 0.6 g of HPEMA and 0.9 g of toluene (a toluene solution of 40% by mass) was prepared and a viscosity was measured. The viscosity was 538 mPa·s at a measuring temperature of 20° C.

Comparative Example

Photopolymerization

Comparative Example 1

<Synthesis of Styrene-Based Hyperbranched Polymer HPS Having a Dithiocarbamate Group at a Molecule Terminal Thereof>

In a 50-mL reaction flask, 6 g of S-DC and 4 g of xylene were charged, followed by purging the inside of the reaction system with nitrogen. The solution was placed at a position of 5 cm away from a high-pressure mercury lamp of 100 W (manufactured by Sen Lights Corporation; HL-100), and a photopolymerization reaction by external irradiation was preformed at the room temperature for 7 hours with stirring. The conversion ratio at this moment was 55% (the reaction was terminated at a conversion ratio of about 50 to 60% as a rough target so as to enable this conversion ratio be compared with a conversion ratio of Examples). At this time, a substance insoluble in xylene (a gelation product) was generated in the flask. Thus, the solution was diluted with 20 g of xylene, and then the insoluble substance was filtered using a filter paper (No. 5B Kiriyama filter paper). The reaction solution was subjected to reprecipitation purification using 300 g of methanol, and then filtered under reduced pressure to produce a white solid. The obtained solid was redissolved with 20 g of xylene and subjected to reprecipitation purification using 600 g of methanol, and then filtered under reduced pressure and vacuum-dried to obtain 2.4 g of an objective HPS. Obtained yield was 40%.

The weight average molecular weight Mw that is a relative molecular weight measured by GPC in a converted molecular weight as polystyrene was 15,000 and the degree of distribution Mw/Mn was 4.0. The results of the element analysis were carbon: 64.6%, hydrogen: 7.4%, nitrogen: 5.0% and sulfur: 25.3%. By a thermogravimetric analysis, it was found that the temperature at which the weight of the polymer reduced by 5% was 248° C.

When an absolute molecular weight was measured, the weight average molecular weight Mw was 31,000.

The degree of branching was 2.07 in this measurement.

Viscosity was measured as follows. A homogeneous solution of 0.6 g of HPS and 0.9 g of toluene (a toluene solution of 40% by mass) was prepared and a viscosity was measured. The viscosity was 32 mPa·s at a measuring temperature of 20° C.

Comparative Examples 2 to 3

HPSs were obtained in a similar manner to Comparative Example 1 except that the distance from the high-pressure mercury lamp was set to the distances shown in Table 8.

TABLE 8

Distance from high-pressure mercury lamp

| Comparative Example | Distance (cm) | Polymerization time (hr) | Conversion ratio (%) | Molecular weight (Mw) Relative | Molecular weight (Mw) Absolute | Degree of branching | Viscosity (mPa·s) |
|---|---|---|---|---|---|---|---|
| 1 | 5 | 7 | 55 | 15,000 | 31,000 | 2.07 | 32 |
| 2 | 10 | 7 | 51 | 34,000 | 69,000 | 2.03 | 60 |
| 3 | 20 | 9 | 50 | 61,000 | 120,000 | 1.97 | 137 |

Comparative Example 4

In a 1,500-mL reaction flask, 800 g of S-DC and 533 g of toluene were charged and the resultant mixture was stirred to prepare a light yellow transparent solution, followed by purging the inside of the reaction system with nitrogen. From the center of the solution, a high-pressure mercury lamp of 400 W (manufactured by Sen Lights Corporation; HL-400B) was lighted to perform a photopolymerization reaction by internal irradiation at the room temperature for 7 hours with stirring. At this time, a substance insoluble in toluene (a gelation product) was generated in the flask. Thus, the solution was diluted with 2.7 kg of toluene, and then the insoluble substance was filtered using a filter paper (No. 5B Kiriyama filter paper). The reaction solution was subjected to reprecipitation purification using 80 kg of methanol, and then filtered under reduced pressure to produce a white solid. The obtained solid was redissolved with 1.6 kg of toluene and subjected to reprecipitation purification using 40 kg of methanol, and then filtered under reduced pressure and vacuum-dried to produce 318 g of an objective HPS. Obtained yield was 40%.

The weight average molecular weight Mw that is a relative molecular weight measured by GPC in a converted molecular weight as polystyrene was 20,000, and the degree of distribution Mw/Mn was 3.51. When an absolute molecular weight was measured, the weight average molecular weight Mw was 32,000.

The degree of branching was 1.60 in this measurement.

Viscosity was measured as follows. A homogeneous solution of 0.6 g of HPS and 0.9 g of toluene (a toluene solution of 40% by mass) was prepared and a viscosity was measured. The viscosity was 37 mPa·s at a measuring temperature of 20° C.

Comparative Example 5

<Synthesis of 1,2-bis(N,N-diethyldithiocarbamyl)ethane EDC2>

In a 1,000-mL reaction flask, 1,2-dichloroethane, 109 g of sodium N,N-diethyldithiocarbamate trihydrate (manufactured by Kanto Chemical Co., Inc.) and 400 g of acetone were charged, and the reaction mixture was reacted at a temperature of 40° C. for 18 hours with stirring. After the completion of the reaction, deposited sodium chloride was filtered to be removed, and then acetone was distilled off from the reaction solution using an evaporator to thereby obtain a reaction crude powder. The obtained reaction crude powder was redissolved in toluene and the resultant liquid was separated in toluene/water. Thereafter, toluene was distilled off to produce a white crude crystal. The white crude crystal was recrystallized using 180 g of toluene to produce 48 g (yield; 75%) of an objective white crystal (EDC2). The purity (area percentage) was 99% as measured by liquid chromatography.

Comparative Example 6

<Synthesis of linear polychloromethylstyrene LPS-Cl>

In a 100-mL reaction flask, 20 g of chloromethylstyrene (manufactured by Seimi Chemical Co., Ltd.; trade name: CMS-14), 20 g of toluene and 0.24 g of EDC2 were charged, followed by purging the inside of the reaction system with nitrogen. The solution was placed at a position of 5 cm away from a high-pressure mercury lamp of 100 W (manufactured by Sen Lights Corporation; HL-100), and a photopolymerization reaction by external irradiation was preformed at the room temperature for 5 hours with stirring. The conversion ratio at this moment was 20%. After dilution by adding 60 g of toluene, the reaction solution was subjected to reprecipitation purification using 1,000 g of methanol, and then filtered under reduced pressure to produce a white solid. The obtained solid was redissolved with 10 g of xylene and subjected to reprecipitation purification using 1,000 g of methanol, and then filtered under reduced pressure and vacuum-dried to produce 2.8 g of objective LPS-Cl. Obtained yield was 14%.

Comparative Example 7

<Synthesis of Linear Polystyrene LPS Having a Dithiocarbamate Group on a Side Chain Thereof>

In a 100-mL reaction flask, 2.0 g of LPS-Cl synthesized in Comparative Example 6, 4.0 g of sodium N,N-diethyldithiocarbamate trihydrate (manufactured by Kanto Chemical Co., Inc.) and 48 g of NMP were charged, and the reaction mixture was reacted at a temperature of 40° C. for 18 hours with stirring. After the completion of the reaction, NMP was distilled off from the reaction solution to produce a reaction crude powder. The obtained reaction crude powder was redissolved in 20 g of toluene, and the resultant liquid was separated in toluene/water. Thereafter, toluene was distilled off to produce a white solid. The obtained white solid was dissolved using 20 g of toluene and subjected to reprecipitation purification using 600 g of methanol, and then filtered under reduced pressure and vacuum-dried to produce 3.2 g of objective LPS. Obtained yield was 91%.

The weight average molecular weight Mw that is a relative molecular weight measured by GPC in a converted molecular weight as polystyrene was 35,000 and the degree of distribution Mw/Mn was 2.2.

When an absolute molecular weight was measured, the weight average molecular weight Mw was 42,000.

The degree of branching was 1.20 in this measurement.

Viscosity was measured as follows. A homogeneous solution of 0.6 g of LPS and 0.9 g of toluene (a toluene solution of 40% by mass) was prepared and a viscosity was measured. The viscosity was 95 mPa·s at a measuring temperature of 20° C.

Results of Comparative Example 7 and Example 15 are shown in Table 9.

TABLE 9

| | Molecular weight (Mw) | | Degree of Branching | Viscosity (mPa · s) |
| --- | --- | --- | --- | --- |
| | Relative | Absolute | | |
| Comparative Example 7 | 35,000 | 42,000 | 1.20 | 95 |
| Example 15 | 21,000 | 42,000 | 2.00 | 46 |

Test Example 1

<TEM (Transmission Electron Microscope) Observation>

The hyperbranched polymer synthesized in Example 1 and Comparative Example 1 was dissolved in THF (manufactured by Kanto Chemical Co., Inc.) in a concentration of 0.01% by weight. The obtained solution was dropped on a carbon mesh grid and dried to prepare a sample for TEM observation. As a result of TEM (manufactured by Hitachi, Ltd.; H-8000) observation, every hyperbranched polymer that was a spherical particle having a particle diameter of about 1 to 2 nm was observed. TEM images of the hyperbranched polymers synthesized in Example 1 and Comparative Example 1 are shown in FIG. 1 and FIG. 2, respectively. It is determined that these hyperbranched polymers have almost equal shapes and particle diameters.

Figure 1:
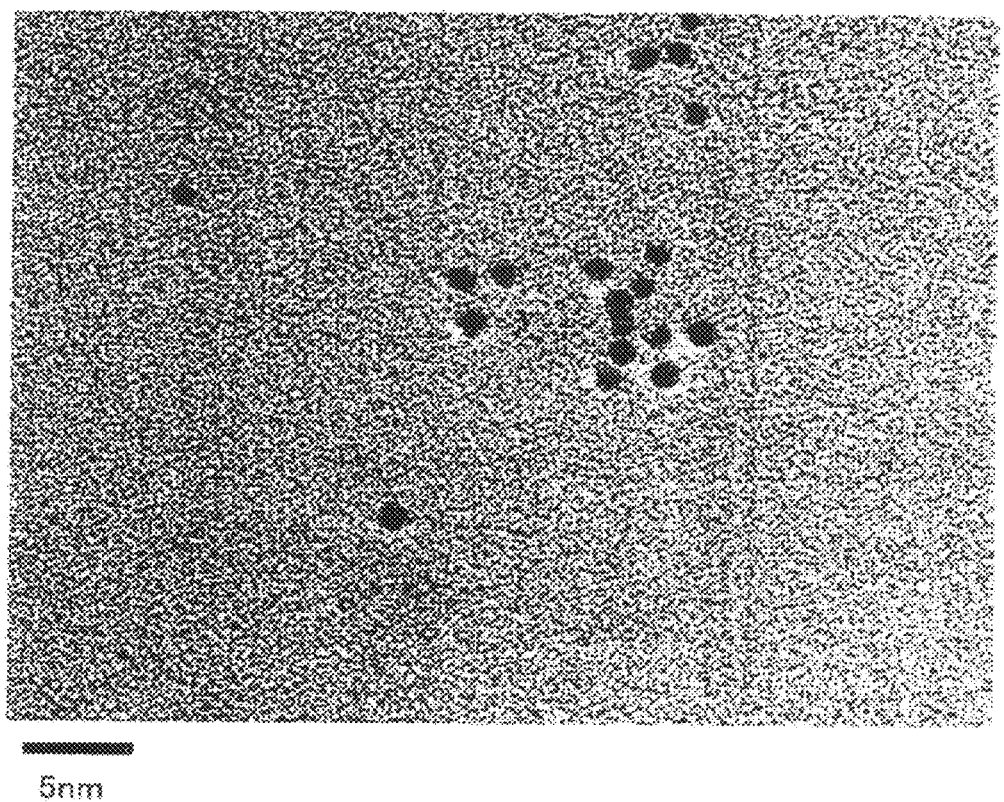
FIG. 1 is a TEM image of the hyperbranched polymer synthesized in Example 1.
Figure 2:
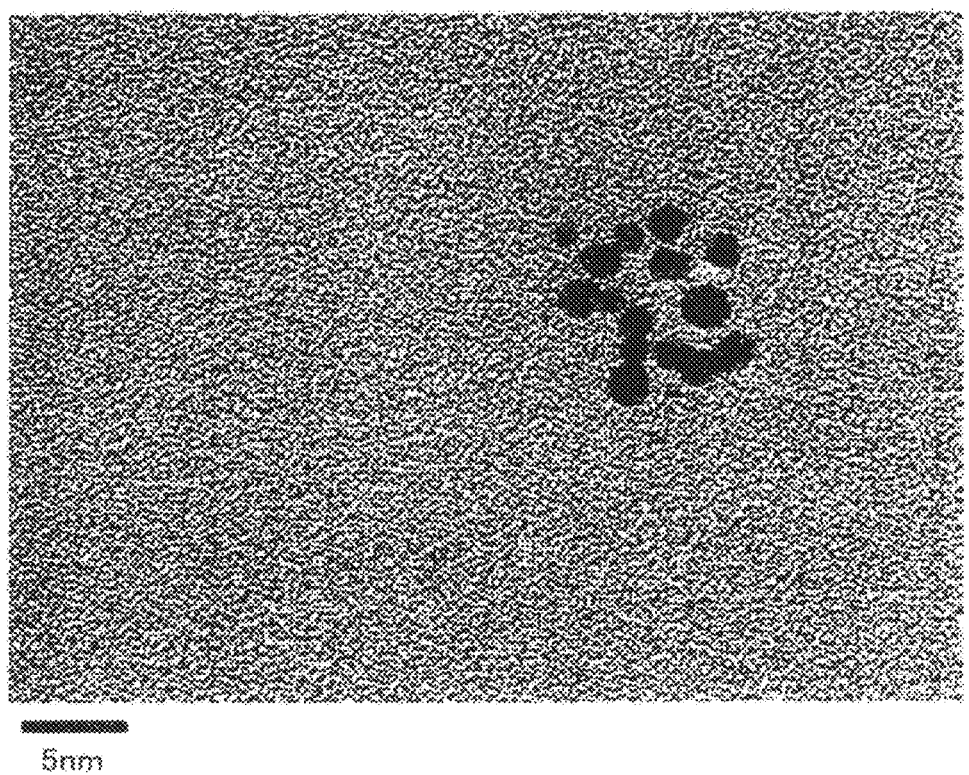
FIG. 2 is a TEM image of the hyperbranched polymer synthesized in Comparative Example 1.

The invention claimed is:

1. A method for producing a hyperbranched polymer comprising:

polymerizing a dithiocarbamate compound of Formula (1) by heating at 50 to 250° C.,

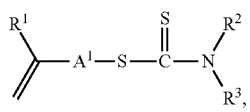
(1)

wherein
$R^1$ is a hydrogen atom or a methyl group;
$R^2$ and $R^3$ are individually a $C_{1-5}$ alkyl group, a $C_{1-5}$ hydroxyalkyl group, or a $C_{7-12}$ arylalkyl group, or $R^2$ and $R^3$ are optionally bonded to each other to form a ring together with a nitrogen atom; and $A^1$ is Formula (2) and/or Formula (3):

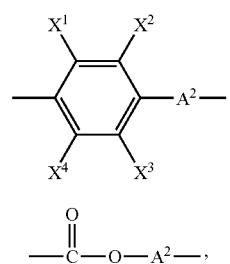
(2)

(3)

and
$A^2$ is a linear, branched or cyclic $C_{1-30}$ alkylene group that optionally contains an ether bond or an ester bond, and
$X^1, X^2, X^3$, and $X^4$ are each independently a hydrogen atom, a $C_{1-20}$ alkyl group, a $C_{1-20}$ alkoxy group, a halogen atom, a nitro group, a hydroxyl group, an amino group, a carboxyl group, or a cyano group; and adding a disulfide compound of Formula (8):

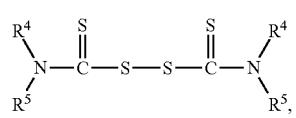
(8)

wherein $R^4$ and $R^5$ are individually a $C_{1-5}$ alkyl group, a $C_{1-5}$ hydroxyalkyl group, or a $C_{7-12}$ arylalkyl group, or $R^4$ and $R^5$ are optionally bonded to each other to form a ring together with a nitrogen atom, and
an amount of the disulfide compound to be added is 0.1 to 20% by mass based on a mass of the dithiocarbamate compound of Formula (1).

2. The method for producing the hyperbranched polymer according to claim 1, wherein the hyperbranched polymer is represented by Formula (4):

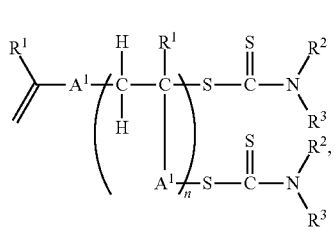
(4)

wherein $R^1, R^2, R^3$, and $A^1$ are the same as defined above, and
n is the number of repeating unit structures and is an integer of 2 to 1,000,000.

3. The method for producing the hyperbranched polymer according to claim 1, wherein AI is Formula (6):

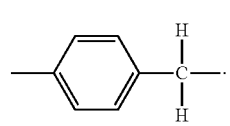
(6)

4. The method for producing the hyperbranched polymer according to claim 1, wherein $A^1$ is Formula (7):

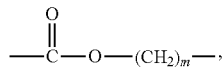  (7)

wherein m is an integer of 2 to 10.

5. The method for producing the hyperbranched polymer according to claim 1, wherein the amount of the disulfide compound of Formula (8) to be added is 1 to 3% by mass based on the mass of the dithiocarbamate compound of Formula (1).

6. A method of polymerization comprising:

polymerizing a dithiocarbamate compound of Formula (1) by heating at 50 to 250° C. in the absence of a radical initiator,

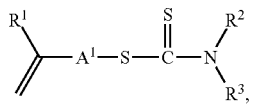  (1)

wherein
- $R^1$ is a hydrogen atom or a methyl group;
- $R^2$ and $R^3$ are individually a $C_{1-5}$ alkyl group, a $C_{1-5}$ hydroxyalkyl group or a $C_{7-12}$ arylalkyl group, or $R^2$ and $R^3$ are optionally bonded to each other to form a ring together with a nitrogen atom; and
- $A^1$ is Formula (2) and/or Formula (3):

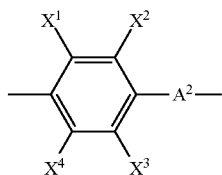  (2)

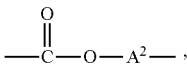  (3)

and $A^2$ is a linear, branched, or cyclic $C_{1-30}$ alkylene group that optionally contains an ether bond or an ester bond, and $X^1$, $X^2$, $X^3$, and $X^4$ are each independently a hydrogen atom, a $C_{1-20}$ alkyl group, a $C_{1-20}$ alkoxy group, a halogen atom, a nitro group, a hydroxyl group, an amino group, a carboxyl group, or a cyano group, and adding a disulfide compound of Formula (8):

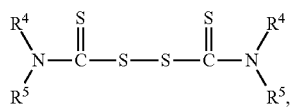  (8)

wherein $R^4$ and $R^5$ are individually a $C_{1-5}$ alkyl group, a $C_{1-5}$ hydroxyalkyl group, or a $C_{7-12}$ arylalkyl group, or $R^4$ and $R^5$ are optionally bonded to each other to form a ring together with a nitrogen atom, and an amount of the disulfide compound to be added is 0.1 to 20% by mass based on a mass of the dithiocarbamate compound of Formula (1).

7. The method of polymerization according to claim 6, wherein the amount of the disulfide compound to be added is 1 to 3% by mass based on the mass of the dithiocarbamate compound of Formula (1).

* * * * *